Figure 1:
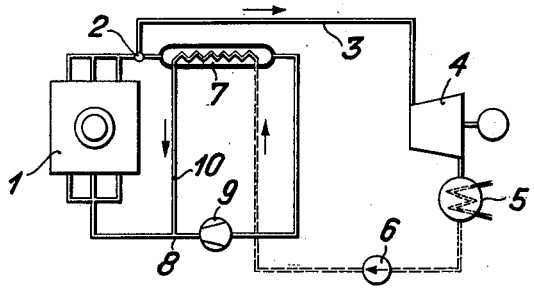

Oct. 13, 1964   J. KÄGI   3,152,962
NUCLEAR POWER PLANT
Filed Sept. 11, 1961   3 Sheets-Sheet 1

Inventor:
JAKOB KÄGI.
By K. A. Mayr.
Attorney.

Oct. 13, 1964   J. KÄGI   3,152,962
NUCLEAR POWER PLANT
Filed Sept. 11, 1961   3 Sheets-Sheet 3

Inventor:
JAKOB KÄGI.
By K. A. Mayr
Attorney

United States Patent Office 3,152,962
Patented Oct. 13, 1964

3,152,962
NUCLEAR POWER PLANT
Jakob Kägi, Winterthur, Switzerland, assignor to Sulzer Freres, S.A., Winterthur, Switzerland, a corporation of Switzerland
Filed Sept. 11, 1961, Ser. No. 137,145
Claims priority, application Switzerland Sept. 21, 1960
11 Claims. (Cl. 176—59)

The invention relates to a nuclear power plant wherein the reactor core is cooled by a gaseous medium, for example steam or vapor, the vapor or gas forming two streams, one stream performing useful work by expansion in a steam engine and being subsequently condensed, while the second stream is circulated by a blower and recooled by evaporating the condensate of the first stream.

It has been proposed to use a gaseous medium, more particularly steam, to remove the heat produced in a nuclear reactor, the reactor usually being supplied with saturated steam which is superheated in the reactor and thereupon divided into two separate streams. The steam forming one stream is expanded in a condensing turbine to perform work, the condensate being supplied to an evaporating drum or to an injection cooler into which the remainder of the superheated steam forming the second stream is introduced. The relative steam quantities, temperatures and pressures must be so that a quantity of liquid corresponding to the flow rate of the first stream is evaporated by cooling of the entire second stream to saturation temperature. All of the steam passing through the reactor must be circulated by a blower. This system has the disadvantage of requiring a rather powerful circulating blower.

It is an object of the invention to provide a steam cooling and power producing system for a nuclear reactor wherein the power required for circulating the steam through the nuclear reactor is considerably reduced. According to the invention the steam forming the cooling medium of the reactor and superheated therein is divided into two streams, one stream being expanded in a steam engine and condensed, the condensate being pumped at increased pressure through a surface or indirect heat exchanger and at least partly evaporated therein by heat received from the steam forming the second stream and conducted as heating agent through the heat exchanger. The steam forming the second stream is circulated by a blower and the first stream emerging from the heat exchanger is mixed with the second stream downstream of the blower.

Aside from the reduction of the power requirement for circulating the reactor coolant, the system according to the invention has the advantage that the steam which is slightly superheated by the adiabatic compression in the circulating blower is cooled to saturation temperature by the admixture of wet steam produced in the heat exchanger and the cooling effect of the steam forced by the blower into the reactor is increased. The system may be so operated as to supply wet steam as coolant to the reactor for further increasing the cooling effect.

The novel features which are considered characteristic of the invention are set forth with particularity in the appended claims. The invention itself, however, and additional objects and advantages thereof will best be understood from the following description of embodiments thereof when read in connection with the accompanying drawing wherein FIGS. 1 to 10 are diagrammatic illustrations of ten different modifications of plants according to the invention.

Referring to FIG. 1, steam which has been superheated in a reactor 1 is divided at the location 2 by a distributing valve into two streams. The steam forming a first stream is supplied through a pipe 3 to a turbine 4 and condensed in a condenser 5; the pressure of the condensate is increased by a pump 6 and supplied to a surface or indirect heat exchanger 7 wherein at least some of the condensate is evaporated. The pipe lines conducting liquid operating medium, i.e., condensate are shown by dotted lines. The steam forming the second stream flows from the distributing valve 2 to the heat exchanger 7, is recooled therein by transferring heat to and evaporating the condensate substantially to the temperature of saturated steam, and is returned by a circulating blower 9 to the reactor. The partly evaporated condensate is conducted as wet steam from the heat exchanger 7 through a pipe 10 and is mixed at 8 with the steam emerging from the blower 9. The use of a surface heat exchanger to evaporate the condensate from the turbine 4 makes it possible to admix the evaporated condensate to the recooled steam downstream of the blower 9. The latter must pump only a part of the total amount of cooling steam for the reactor and can, therefore, be smaller than the circulating pumps of conventional steam cooling systems. The medium which has passed through the turbine is in the liquid state and its pressure is increased with relatively little power to the pressure required for forced flow through the indirect heat exchanger 7 and the reactor core. Since the steam issuing from the blower 9 is slightly superheated, the steam emerging from the pipe 10 may be wet if it is desired to have saturated steam downstream of the mixing point 8. The relative flow rates of the two steam streams downstream of the dividing point 2 may be controlled by a valve which is adjusted manually or in response to pressure and/or the temperature, for instance, in the steam pipe 3. The condensed medium may be preheated in a conventional manner, for instance, by steam tapped from the turbine 4.

Figure 2:
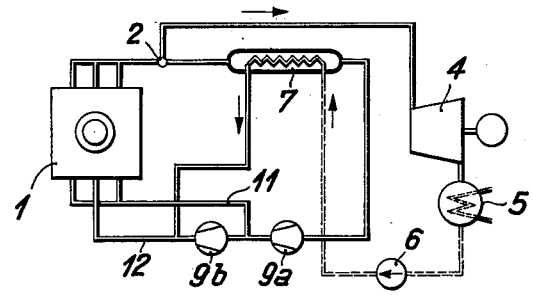

In the embodiment shown in FIG. 2, steam is supplied to the reactor core through separate supply pipes 11 and 12. The particular conditions of heat generation in a nuclear reactor can therefore be satisfied. Because of the uneven neutron flux, much more heat is produced in the central fuel elements of the reactor core than in the elements placed near the periphery of the reactor core. However, since it is desired to raise the temperature at the surface of each fuel element to the highest temperature permitted by the material of which the fuel elements are made, the central fuel rods must be cooled more intensively than the outer fuel rods. This is achieved in the arrangement shown by way of example in FIG. 2 by using a two-stage blower 9a, 9b. The steam which is used to cool peripheral fuel elements is branched off after the first stage whereas the steam which issues from the second stage at a correspondingly greater pressure flows through a pipe 12 to central fuel elements and flows through the associated cooling channels at a correspondingly greater speed.

Assuming that the temperature of the surfaces of the fuel elements is the same, the heat is removed from the peripheral cooling channels at lower average differences between the temperatures of the surfaces of the fissionable material and the temperature of the coolant, so that the coolant leaves the reactor core at a temperature which is higher than the temperature of the coolant leaving the center of the core. This fact is used in the variant shown in FIG. 3 by tapping the turbine steam at locations 13 which are supplied with steam from cooling channels near the periphery of the reactor core.

Figure 3:
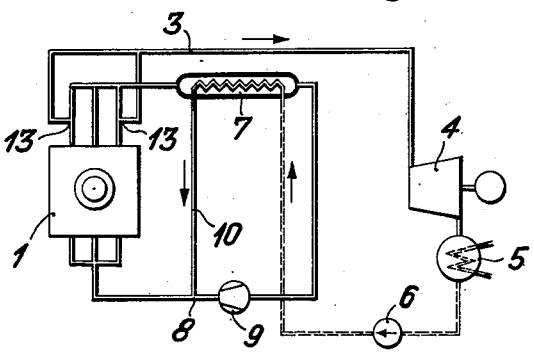
Figure 4:
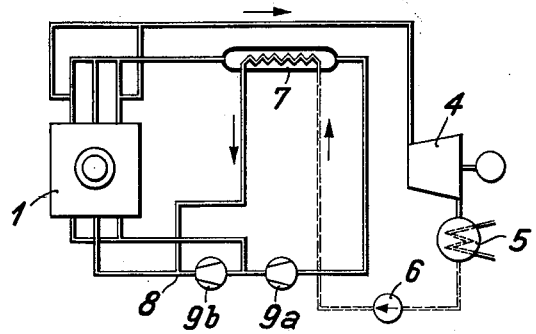

In the embodiment shown in FIG. 4 the features of FIGS. 2 and 3 are combined. Whereas in the embodiment shown in FIG. 3 the peripheral fuel elements are supplied with cooling steam of the same pressure and temperature as those of the steam cooling the central fuel elements, in FIG. 4 the peripheral elements are supplied with relatively hot steam at a relatively low pressure and the central elements are supplied with relatively cool steam at a relatively high pressure. The steam driving the turbine is taken from the peripheral fuel elements as in FIG. 3.

Figure 5:
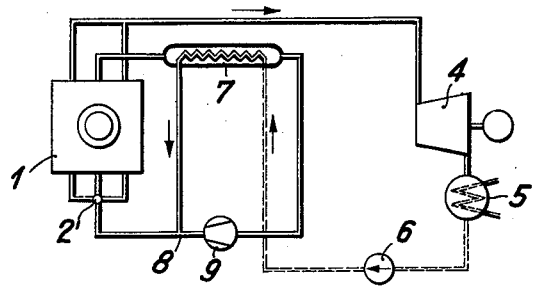

FIG. 5 illustrates a plant wherein the steam is divided into two streams before entering the reactor. In order to obtain desired relative rates of flow an appropriate number of cooling channels must be interposed in each stream. The two streams remain separated until they reach the mixing location 8. Of course, the division of the steam entering the cooling channels in the reactor 1 may be additionally controlled by a distributing valve placed at the dividing location 2'.

Figure 6:
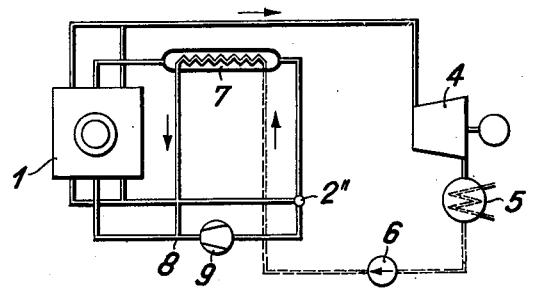

The embodiment shown in FIG. 6 further reduces the power required by the circulating blower. In this embodiment the steam for operating the turbine is tapped at 2" from the connecting pipe between the heat exchanger 7 and the blower 9.

Figure 7:
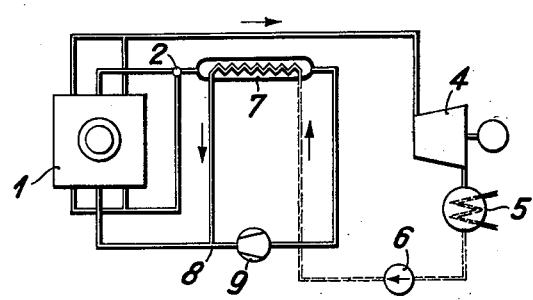

The only difference between the plant shown in FIG. 7 and the plant shown in FIG. 6 is that, in the plant shown in FIG. 7, the steam for operating the turbine is tapped upstream of the heat exchanger, returned through the reactor without recooling, and then supplied to the turbine. In this embodiment the work steam is finally superheated by fuel elements in a peripheral part of the reactor core where the relatively low heat generation permits a relatively high temperature of the steam leaving these fuel elements.

Figure 8:
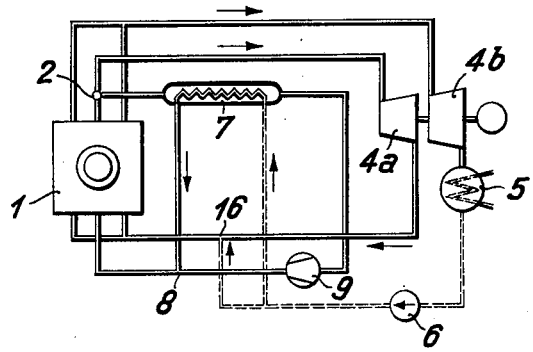

FIG. 8 illustrates a plant comprising a two-stage turbine 4a, 4b and reheating of the steam in the reactor. A small proportion of the condensate from the condenser 5 can be injected into the steam leaving the high pressure turbine for cooling the steam before it is reheated.

Figure 9:
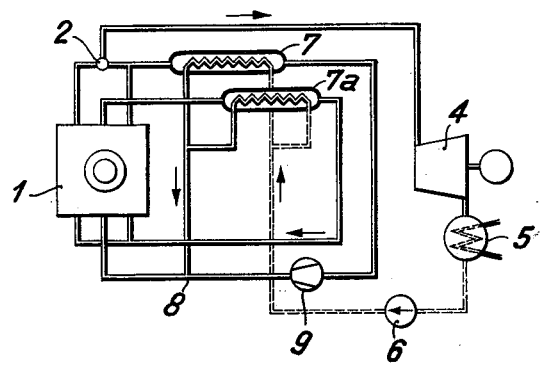
Figure 10:
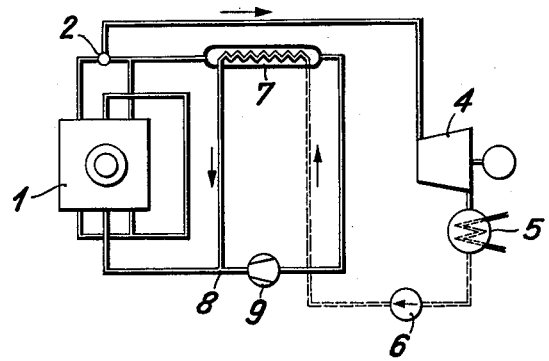

In the embodiments shown in FIGS. 9 and 10 all of the steam passes, after leaving the mixing station 8, through the reactor core in two serially connected passages. As shown in FIG. 9, the steam may be recooled in an additional heat exchanger 7a after the first passage, or, as shown in FIG. 10, the steam passes through the reactor without recooling between the first and the second passage.

Other advantageous variants may, of course, be obtained by different combinations of features of the embodiments hereinbefore described. More particularly, the medium could be so distributed between the two cooling channel groups associated with the concentric core regions that the temperature of the medium leaving the central region is higher than the temperature of the medium leaving the peripheral region.

I claim:
1. Nuclear power plant comprising a nuclear reactor having a core, cooling channels within said core, conduit means forming a circuit, said cooling channels forming part of said conduit means, a vaporizable operating medium passing through said conduit means and being in vapor state and superheated while passing through said cooling channels, a part of said conduit means being divided into two separate conduits arranged, each of said separate conduits having a portion conducting superheated vapor, a steam engine interposed in a first of said separate conduits and being operated by expanding superheated vapor, a condenser interposed in said first separate conduit downstream of said engine for condensing the vapor expanded in said engine, a pump interposed in said first conduit downstream of said condenser for raising the pressure of the condensate to the highest pressure in the circuit, an indirect heat exchanger interposed in said first separate conduit downstream of said pump for receiving condensate therefrom, said indirect heat exchanger being also interposed in the second of said separate conduits for transferring heat from the superheated vapor in said second separate conduit to the condensate in the first conduit for evaporating the condensate in said heat exchanger and cooling the superheated vapor in the second separate conduit, and a blower interposed in said second separate conduit downstream of said heat exchanger, said first separate conduit being connected downstream of said heat exchanger and upstream of said cooling channels to said second separate conduit downstream of said blower and upstream of said cooling channels for admixing the condensate evaporated in said heat exchanger to the vapor cooled in said heat exchanger.

2. Nuclear power plant as defined in claim 1 wherein said conduit means are divided into two separate conduits downstream of said cooling channels.

3. Nuclear power plant as defined in claim 1 wherein said blower has at least two pressure stages, a conduit being provided interconnecting said two pressure stages, said connecting conduit being connected for vapor flow to a plurality of said cooling channels.

4. Nuclear power plant as defined in claim 1 wherein said cooling channels comprise two groups of channels, the channels of one group being located in a central part of said core and the channels of the second group being located in a peripheral part of said core, said operating medium being superheated to different temperatures in the channels of different groups.

5. Nuclear power plant as defined in claim 4 wherein the temperature of the vapor leaving the channels of the second group is higher than the temperature of the vapor leaving the channels of the first group, and the second group of channels forms part of the first of said separate conduits and supplies superheated vapor to said steam engine.

6. Nuclear power plant as defined in claim 4 wherein said conduit means are divided into two separate conduits upstream of said cooling channels and the group of channels wherein the operating medium is superheated to a higher temperature forms part of the first of said separate conduits.

7. Nuclear power plant as defined in claim 4 wherein said conduit means are divided into two separate conduits between said heat exchanger and said blower and the group of channels wherein the operating medium is superheated to a higher temperature forms part of the first of said separate conduits.

8. Nuclear power plant as defined in claim 4 wherein said conduit means are divided into two separate conduits downstream of the group of channels wherein the operating medium is superheated to a lower temperature and the group of channels wherein the operating medium is superheated to a higher temperature forms part of the first of said separate conduits.

9. Nuclear power plant as defined in claim 1 wherein said steam engine has two pressure stages, conduit means being provided interconnecting said two stages and including a plurality of said cooling channels for reheating the steam between said stages.

10. Nuclear power plant as defined in claim 1 wherein said cooling channels form two groups of channels, each group being located in a different part of said core, said groups of channels being arranged in series relation with respect to the flow of the operating medium, and said conduit means are divided into two separate conduits downstream of the group of channels passed last by the operating medium.

11. Nuclear power plant according to claim 10, comprising an additional indirect heat exchanger interposed for vapor flow between said two groups of channels, and connected for condensate flow to said first conduit in parallel relation to the heat exchanger interposed in the second conduit.

References Cited in the file of this patent

Proceedings of the Second United Nations International Conference on the Peaceful Uses of Atomic Energy, held in Geneva. Vol. 8, Part 1, United Nations, 1958, pp. 401, 402, 406–410.